US012786280B2

(12) United States Patent
Kumar et al.

(10) Patent No.: US 12,786,280 B2
(45) **Date of Patent: *Nov. 3, 2026**

(54) RAPID ERROR DETECTION THROUGH COMMAND VALIDATION

(71) Applicant: ServiceNow, Inc., Santa Clara, CA (US)

(72) Inventors: Abhishek Kumar, Bangalore (IN); Tal Ben Ari, Petah Tikva (IL); Renan Coelho Silva, Orlando, FL (US); Sreenevas Subramaniam, Santa Clara, CA (US); Manish Satish Vimla Kumar, Bangalore (IN)

(73) Assignee: ServiceNow, Inc., Santa Clara, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 18/936,126

(22) Filed: Nov. 4, 2024

(65) Prior Publication Data

US 2025/0063099 A1 Feb. 20, 2025

Related U.S. Application Data

(63) Continuation of application No. 17/862,680, filed on Jul. 12, 2022, now Pat. No. 12,231,508.

(51) Int. Cl.
*H04L 67/51* (2022.01)
*H04L 41/069* (2022.01)
*H04L 67/56* (2022.01)

(52) U.S. Cl.
CPC ............ *H04L 67/51* (2022.05); *H04L 41/069* (2013.01); *H04L 67/56* (2022.05)

(58) Field of Classification Search
None
See application file for complete search history.

(56) References Cited

U.S. PATENT DOCUMENTS 4,941,084 A 7/1990 Terada et al.
5,185,860 A 2/1993 Wu
(Continued)

FOREIGN PATENT DOCUMENTS

CN 111614729 B 6/2023
EP 0433979 A2 6/1991
(Continued)

OTHER PUBLICATIONS

Australian Examination Report, Australian Patent Application No. 2023203026, mailed Mar. 4, 2024.
(Continued)

*Primary Examiner* — Phyllis A Book
(74) *Attorney, Agent, or Firm* — McDonnell Boehnen Hulbert & Berghoff LLP

(57) ABSTRACT

Persistent storage may contain a list of discovery commands, the discovery commands respectively associated with lists of network addresses. A discovery validation application, when executed by one or more processors, may be configured to: read, from the persistent storage, the list of discovery commands and the lists of network addresses; for each discovery command in the list of discovery commands, transmit, by way of one or more proxy servers deployed external to the system, the discovery command to each network address in the respectively associated list of network addresses; receive, by way of the one or more proxy servers, discovery results respectively corresponding to each of the discovery commands that were transmitted, wherein the discovery results either indicate success or failure of the discovery commands; and write, to the persistent storage, the discovery results.

20 Claims, 11 Drawing Sheets

(56) References Cited

U.S. PATENT DOCUMENTS

| | | | |
|---|---|---|---|
| 5,237,518 | A | 8/1993 | Sztipanovits et al. |
| 5,261,097 | A | 11/1993 | Saxon |
| 5,265,252 | A | 11/1993 | Rawson, III et al. |
| 5,367,685 | A | 11/1994 | Gosling |
| 5,390,297 | A | 2/1995 | Barber et al. |
| 5,442,791 | A | 8/1995 | Wrabetz et al. |
| 5,452,415 | A | 9/1995 | Hotka |
| 5,522,042 | A | 5/1996 | Fee et al. |
| 5,533,116 | A | 7/1996 | Vesterinen |
| 5,655,081 | A | 8/1997 | Bonnell et al. |
| 5,659,736 | A | 8/1997 | Hasegawa et al. |
| 5,671,412 | A | 9/1997 | Christiano |
| 5,696,701 | A | 12/1997 | Burgess et al. |
| 5,715,463 | A | 2/1998 | Merkin |
| 5,745,879 | A | 4/1998 | Wyman |
| 5,761,502 | A | 6/1998 | Jacobs |
| 5,764,913 | A | 6/1998 | Jancke et al. |
| 5,887,139 | A | 3/1999 | Madison, Jr. et al. |
| 5,909,217 | A | 6/1999 | Bereiter |
| 5,937,165 | A | 8/1999 | Schwaller, II et al. |
| 5,949,976 | A | 9/1999 | Chappelle |
| 5,978,594 | A | 11/1999 | Bonnell et al. |
| 6,021,437 | A | 2/2000 | Chen et al. |
| 6,041,347 | A | 3/2000 | Harsham et al. |
| 6,088,717 | A | 7/2000 | Reed et al. |
| 6,101,500 | A | 8/2000 | Lau |
| 6,128,016 | A | 10/2000 | Coelho et al. |
| 6,131,118 | A | 10/2000 | Stupek, Jr. et al. |
| 6,134,581 | A | 10/2000 | Ismael et al. |
| 6,138,122 | A | 10/2000 | Smith et al. |
| 6,148,335 | A | 11/2000 | Haggard et al. |
| 6,166,732 | A | 12/2000 | Mitchell et al. |
| 6,167,448 | A | 12/2000 | Hemphill et al. |
| 6,175,866 | B1 | 1/2001 | Holloway et al. |
| 6,175,878 | B1 | 1/2001 | Seaman et al. |
| 6,260,050 | B1 | 7/2001 | Yost et al. |
| 6,263,457 | B1 | 7/2001 | Anderson et al. |
| 6,272,150 | B1 | 8/2001 | Hrastar et al. |
| 6,336,138 | B1 | 1/2002 | Caswell et al. |
| 6,363,421 | B2 | 3/2002 | Barker et al. |
| 6,393,386 | B1 | 5/2002 | Zager et al. |
| 6,397,245 | B1 | 5/2002 | Johnson, II et al. |
| 6,434,626 | B1 | 8/2002 | Prakash et al. |
| 6,438,592 | B1 | 8/2002 | Killian |
| 6,456,306 | B1 | 9/2002 | Chin et al. |
| 6,466,932 | B1 | 10/2002 | Dennis et al. |
| 6,487,590 | B1 | 11/2002 | Foley et al. |
| 6,505,248 | B1 | 1/2003 | Casper et al. |
| 6,526,442 | B1 | 2/2003 | Stupek, Jr. et al. |
| 6,621,823 | B1 | 9/2003 | Mellquist et al. |
| 6,707,795 | B1 | 3/2004 | Noorhosseini et al. |
| 6,742,015 | B1 | 5/2004 | Bowman-Amuah |
| 6,763,380 | B1 | 7/2004 | Mayton et al. |
| 6,816,898 | B1 | 11/2004 | Scarpelli et al. |
| 6,895,586 | B1 | 5/2005 | Brasher et al. |
| 6,948,175 | B1 | 9/2005 | Fong et al. |
| 6,985,901 | B1 | 1/2006 | Sachse et al. |
| 7,003,564 | B2 | 2/2006 | Greuel et al. |
| 7,028,228 | B1 | 4/2006 | Lovy et al. |
| 7,043,537 | B1 | 5/2006 | Pratt |
| 7,043,661 | B2 | 5/2006 | Valadarsky et al. |
| 7,062,683 | B2 | 6/2006 | Warpenburg et al. |
| 7,096,459 | B2 | 8/2006 | Keller et al. |
| 7,146,574 | B2 | 12/2006 | Goldthwaite et al. |
| 7,197,466 | B1 | 3/2007 | Peterson et al. |
| 7,215,360 | B2 | 5/2007 | Gupta |
| 7,216,304 | B1 | 5/2007 | Gourdol et al. |
| 7,222,147 | B1 | 5/2007 | Black et al. |
| 7,281,170 | B2 | 10/2007 | Taylor et al. |
| 7,328,260 | B1 | 2/2008 | Muthiyan et al. |
| 7,412,502 | B2 | 8/2008 | Fearn et al. |
| 7,505,872 | B2 | 3/2009 | Keller et al. |
| 7,593,013 | B2 | 9/2009 | Agutter et al. |
| 7,596,716 | B2 | 9/2009 | Frost et al. |
| 7,617,073 | B2 | 11/2009 | Trinon et al. |
| 7,660,731 | B2 | 2/2010 | Chaddha et al. |
| 7,676,294 | B2 | 3/2010 | Baier et al. |
| 7,676,437 | B2 | 3/2010 | Satkunanathan et al. |
| 7,840,490 | B1 | 11/2010 | Sellers et al. |
| 7,877,783 | B1 | 1/2011 | Cline et al. |
| 7,890,869 | B1 | 2/2011 | Mayer et al. |
| 7,966,398 | B2 | 6/2011 | Wiles, Jr. |
| 8,060,396 | B1 | 11/2011 | Bessler et al. |
| 8,196,210 | B2 | 6/2012 | Sterin |
| 8,321,948 | B2 | 11/2012 | Robinson et al. |
| 8,407,669 | B2 | 3/2013 | Yee et al. |
| 8,554,750 | B2 | 10/2013 | Rangarajan et al. |
| 8,595,647 | B2 | 11/2013 | Sabin et al. |
| 8,620,818 | B2 | 12/2013 | Hughes et al. |
| 8,646,093 | B2 | 2/2014 | Myers et al. |
| 8,674,992 | B2 | 3/2014 | Poston et al. |
| 8,725,647 | B2 | 5/2014 | Disciascio et al. |
| 9,053,460 | B2 | 6/2015 | Gilbert et al. |
| 9,069,737 | B1 | 6/2015 | Kimotho et al. |
| 9,900,211 | B1 | 2/2018 | Mach |
| 9,971,826 | B1 | 5/2018 | Belmar |
| 10,225,160 | B1 | 3/2019 | Polinati |
| 10,673,963 | B1 | 6/2020 | Feiguine et al. |
| 10,749,943 | B1 | 8/2020 | Feiguine et al. |
| 10,771,344 | B2 | 9/2020 | Bitterfeld et al. |
| 10,824,650 | B2 | 11/2020 | Bar Oz et al. |
| 10,944,654 | B2 | 3/2021 | Rimar et al. |
| 10,999,152 | B1 | 5/2021 | Bar Oz et al. |
| 11,025,481 | B1 | 6/2021 | Louca et al. |
| 11,089,115 | B2 | 8/2021 | Garty et al. |
| 11,095,506 | B1 | 8/2021 | Erblat et al. |
| 11,095,534 | B1 | 8/2021 | Dunsmore |
| 11,275,580 | B2 | 3/2022 | Tamir et al. |
| 11,277,475 | B1 | 3/2022 | Tal et al. |
| 11,281,442 | B1 | 3/2022 | Tal et al. |
| 11,294,666 | B1 | 4/2022 | Look |
| 11,296,922 | B2 | 4/2022 | Leibkowiz et al. |
| 11,301,503 | B2 | 4/2022 | Burli |
| 11,379,089 | B2 | 7/2022 | Goswami et al. |
| 11,451,573 | B2 | 9/2022 | Waplington |
| 11,470,107 | B2 | 10/2022 | Waplington |
| 11,582,106 | B2 | 2/2023 | Hameiri et al. |
| 11,616,690 | B2 | 3/2023 | Feiguine et al. |
| 11,630,717 | B2 | 4/2023 | Vutukuru et al. |
| 11,632,303 | B2 | 4/2023 | Bitterfeld et al. |
| 11,640,369 | B2 | 5/2023 | Bhogle et al. |
| 11,671,444 | B2 | 6/2023 | Waplington |
| 11,695,641 | B2 | 7/2023 | Bar Oz et al. |
| 11,829,233 | B2 | 11/2023 | Watkins et al. |
| 11,868,593 | B2 | 1/2024 | Bradley et al. |
| 2002/0116340 | A1 | 8/2002 | Hellberg et al. |
| 2002/0133584 | A1 | 9/2002 | Greuel et al. |
| 2002/0158969 | A1 | 10/2002 | Gupta |
| 2003/0118087 | A1 | 6/2003 | Goldthwaite et al. |
| 2003/0200293 | A1 | 10/2003 | Fearn et al. |
| 2005/0015217 | A1 | 1/2005 | Weidl et al. |
| 2005/0091356 | A1 | 4/2005 | Izzo |
| 2006/0026453 | A1 | 2/2006 | Frost et al. |
| 2006/0095461 | A1 | 5/2006 | Raymond |
| 2006/0179058 | A1 | 8/2006 | Bram et al. |
| 2006/0288053 | A1 | 12/2006 | Holt et al. |
| 2006/0293942 | A1 | 12/2006 | Chaddha et al. |
| 2007/0033279 | A1 | 2/2007 | Battat et al. |
| 2007/0143471 | A1 | 6/2007 | Hicks |
| 2007/0188494 | A1 | 8/2007 | Agutter et al. |
| 2007/0288389 | A1 | 12/2007 | Vaughan et al. |
| 2008/0049644 | A1 | 2/2008 | Halbert |
| 2008/0133289 | A1 | 6/2008 | Armour et al. |
| 2008/0148253 | A1 | 6/2008 | Badwe et al. |
| 2008/0319779 | A1 | 12/2008 | Hughes et al. |
| 2009/0088875 | A1 | 4/2009 | Baier et al. |
| 2009/0228984 | A1 | 9/2009 | Sterin |
| 2010/0110932 | A1 | 5/2010 | Doran et al. |
| 2011/0276693 | A1 | 11/2011 | Jensen-Horne |
| 2013/0283273 | A1 | 10/2013 | Miyazaki |
| 2014/0047544 | A1 | 2/2014 | Jakobsson |
| 2014/0122427 | A1 | 5/2014 | Dary |
| 2017/0064021 | A1 | 3/2017 | Serebro |
| 2018/0032371 | A1 | 2/2018 | Johnson |

(56) References Cited

U.S. PATENT DOCUMENTS

| | | | |
|---|---|---|---|
| 2018/0123940 A1 | 5/2018 | Rimar et al. | |
| 2018/0357422 A1 | 12/2018 | Telang | |
| 2019/0073257 A1 | 3/2019 | Dasgupta et al. | |
| 2019/0104398 A1 | 4/2019 | Owen et al. | |
| 2019/0129739 A1 | 5/2019 | Al Reza et al. | |
| 2019/0132362 A1 | 5/2019 | Hutchinson | |
| 2019/0149515 A1 | 5/2019 | Sharma et al. | |
| 2019/0165957 A1 | 5/2019 | Abbott et al. | |
| 2019/0273665 A1 | 9/2019 | Polinati | |
| 2019/0342156 A1 | 11/2019 | Dhuleshia | |
| 2019/0342162 A1 | 11/2019 | Bendre et al. | |
| 2019/0342744 A1* | 11/2019 | Owen | H04L 67/51 |
| 2020/0034462 A1 | 1/2020 | Narayanasamy et al. | |
| 2020/0050689 A1 | 2/2020 | Tal et al. | |
| 2020/0201666 A1* | 6/2020 | Aron | H04L 67/53 |
| 2020/0204443 A1 | 6/2020 | Bar Oz et al. | |
| 2020/0236187 A1* | 7/2020 | Tal | H04L 63/0281 |
| 2020/0296173 A1* | 9/2020 | Feiguine | G06F 9/5072 |
| 2020/0301678 A1 | 9/2020 | Burman et al. | |
| 2020/0304377 A1* | 9/2020 | Subramaniam | H04L 41/046 |
| 2020/0311003 A1 | 10/2020 | Zimmermann | |
| 2020/0409934 A1* | 12/2020 | Bar Oz | G06F 16/215 |
| 2021/0097168 A1 | 4/2021 | Patel et al. | |
| 2021/0176129 A1* | 6/2021 | Bitterfeld | G06F 9/45512 |
| 2021/0194764 A1* | 6/2021 | Badyan | G06F 16/22 |
| 2021/0203569 A1* | 7/2021 | Garty | G06F 3/04817 |
| 2022/0029886 A1 | 1/2022 | Hameiri | |
| 2022/0303352 A1 | 9/2022 | Herzog et al. | |
| 2023/0229542 A1 | 7/2023 | Watkins et al. | |

FOREIGN PATENT DOCUMENTS

| | | |
|---|---|---|
| EP | 1607824 A2 | 12/2005 |
| EP | 3567805 B1 | 8/2022 |
| EP | 3723347 B1 | 10/2022 |
| WO | 9934285 A1 | 7/1999 |
| WO | 0052559 A1 | 9/2000 |
| WO | 0179970 A1 | 10/2001 |

OTHER PUBLICATIONS

Canadian Examination Report, Canadian Patent Application No. 3,200,033, mailed Sep. 24, 2024.

Extended European Search Report, European Patent Application No. 23184216.2, mailed Nov. 27, 2023.

Office Action, Japanese Patent App. No. 2023-109293, mailed Jul. 29, 2024.

Australian Examination Report, Australian Patent Application No. 2023203026, mailed Oct. 24, 2024.

Australian Examination Report, Australian Patent Application No. 2023203026, mailed Aug. 1, 2024.

* cited by examiner

DISCOVERY PATTERN 610

1. LOG ON TO <ADDRESS> WITH <CREDENTIALS>

2. REQUEST LIST OF PROCESSING NODES

3. FOR EACH PROCESSING NODE, REQUEST UPTIME AND LOAD

4. REQUEST LIST OF STORAGE NODES

5. FOR EACH STORAGE NODE, REQUEST UTILIZATON

FIG. 6B

RAPID ERROR DETECTION THROUGH COMMAND VALIDATION

CROSS-REFERENCE TO RELATED APPLICATION

This application is a continuation of and claims priority to U.S. patent application Ser. No. 17/862,680, filed Jul. 12, 2022, which is hereby incorporated by reference in its entirety.

BACKGROUND

Discovery is an automated or semi-automated process through which computing devices, as well as software applications installed and/or executing on these computing devices, can be determined and characterized. Representations of such devices and software can be stored in a database as configuration items. Relationships between configuration items can also be determined and stored in the database. Typically applied to a managed network or a public cloud service, discovery provides not only lists of these configuration items and relationships, but also serves as the basis through which higher level applications can manage information technology (IT) infrastructure.

Nonetheless, configuring discovery so that it operates correctly can be a challenge in certain environments. Notably, discovery patterns—script-like lists of commands that provide step-by-step processes for discovering specific devices or systems—can fail due to misconfiguration. But these failures are typically not found out for hours or days, and thus devices or systems for which discovery was sought remain unrepresented in the database.

SUMMARY

The embodiments herein address these and possibly other technical problems by provides mechanisms through which discovery procedures can be tested on a given set of network addresses. In examples, such a mechanism can take the form of a software-based validation tool (also referred to as a “discovery validation application”) that takes a list of discovery commands and the set of network addresses as input. The validation tool then uses discovery infrastructure to test the discovery commands with the network addresses. The validation tool can provide indications of the success or failure of these command/address pairs in a database table, in a file, or by way of a graphical user interface, for example.

Thus, before engaging in discovery procedures, a user can test a discovery pattern against a set of network addresses. Output from the validation tool may indicate the cause of any failures, such as an unsupported command, the network address being unreachable, an authentication failure, or an authorization failure. The user receives any failure indications in a rapid fashion and can take steps to correct or mitigate the failures. Once the discovery pattern can be executed without failure by the validation tool, the pattern can be added to regularly automated discovery procedures with a high degree of confidence that it will be successfully completed.

Accordingly, a first example embodiment may involve persistent storage containing a list of discovery commands, the discovery commands respectively associated with lists of network addresses. The first example embodiment may also involve one or more processors and a discovery validation application that, when executed by the one or more processors, is configured to: read, from the persistent storage, the list of discovery commands and the lists of network addresses; for each discovery command in the list of discovery commands, transmit, by way of one or more proxy servers deployed external to the system, the discovery command to each network address in the respectively associated list of network addresses; receive, by way of the one or more proxy servers, discovery results respectively corresponding to each of the discovery commands that were transmitted, wherein the discovery results either indicate success or failure of the discovery commands; and write, to the persistent storage, the discovery results.

A second example embodiment may involve reading, by a discovery validation application and from persistent storage, a list of discovery commands respectively associated with lists of network addresses, and the lists of network addresses. The second example embodiment may also involve, for each discovery command in the list of discovery commands, transmitting, by the discovery validation application and by way of one or more proxy servers, the discovery command to each network address in the respectively associated list of network addresses. The second example embodiment may also involve receiving, by the discovery validation application and by way of the one or more proxy servers, discovery results respectively corresponding to each of the discovery commands that were transmitted, wherein the discovery results either indicate success or failure of the discovery commands. The second example embodiment may also involve writing, by the discovery validation application and to the persistent storage, the discovery results.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 6B depicts a simple discovery pattern for the virtual machine cluster of FIG. 6A, in accordance with example embodiments.

DETAILED DESCRIPTION

Figure 1:
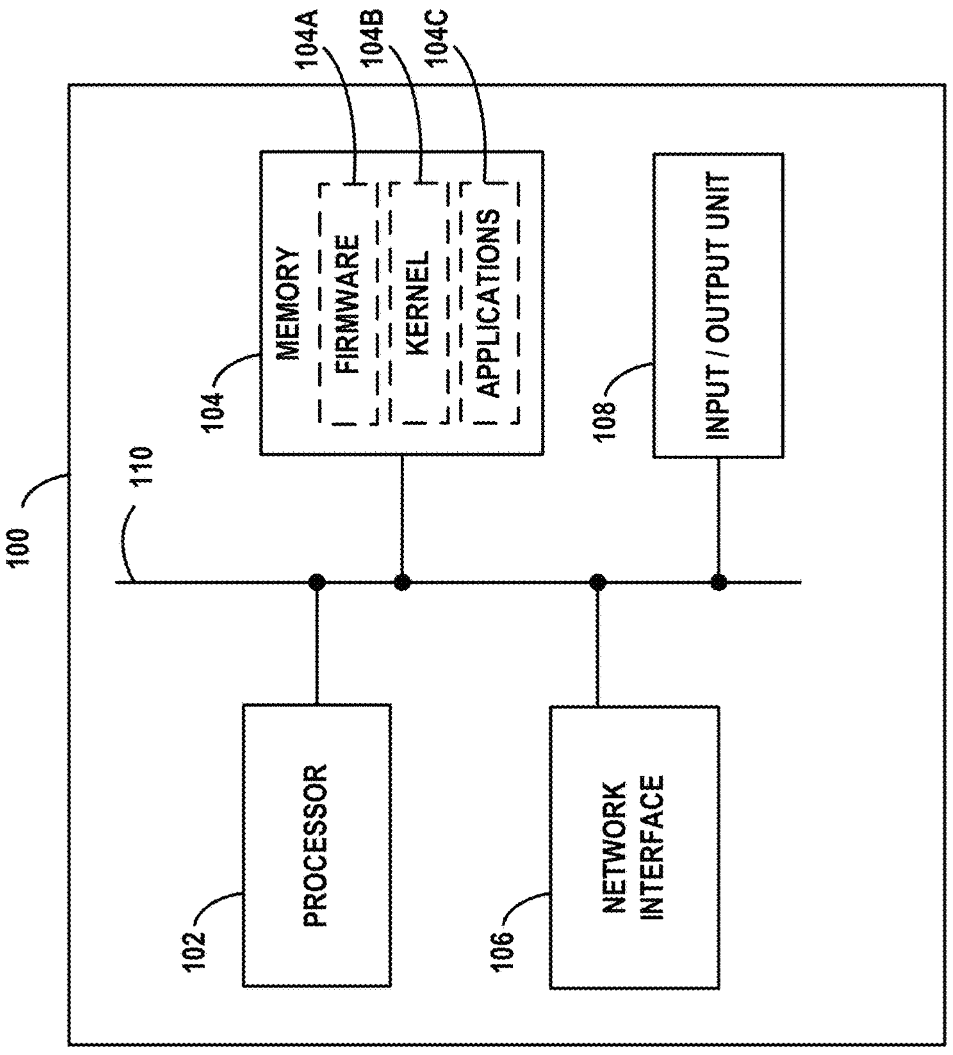
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security. Nonetheless, the embodiments herein are not limited to enterprise applications or environments, and can be more broadly applied.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure. In some cases, applications structured differently than MVC, such as those using unidirectional data flow, may be employed.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HyperText Markup Language (HTML) and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
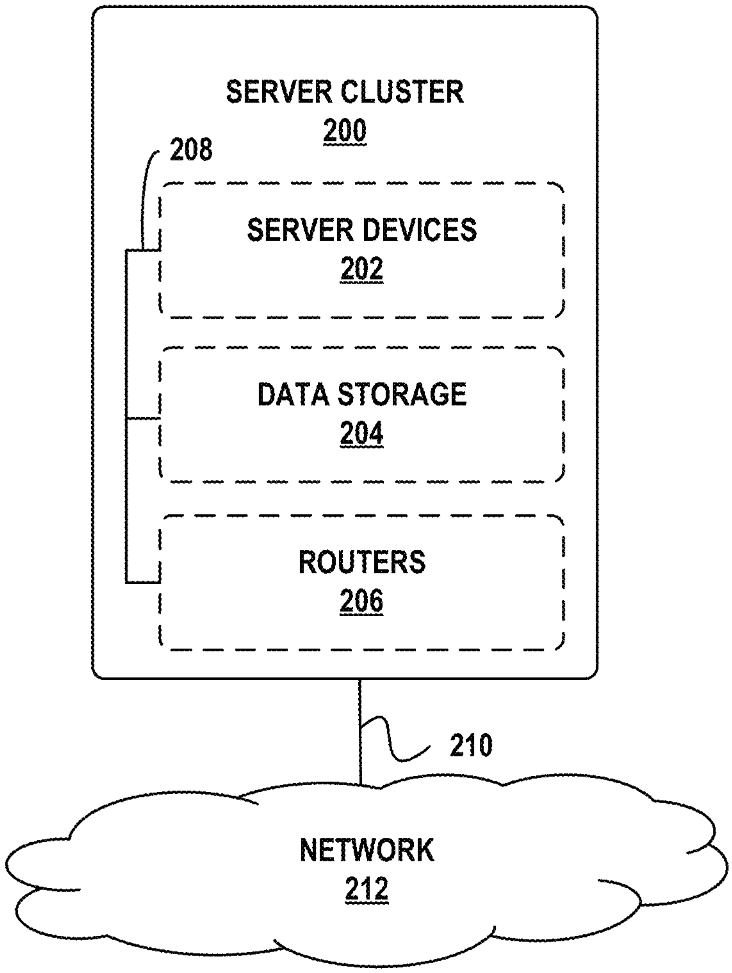
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as HTML, the extensible Markup Language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
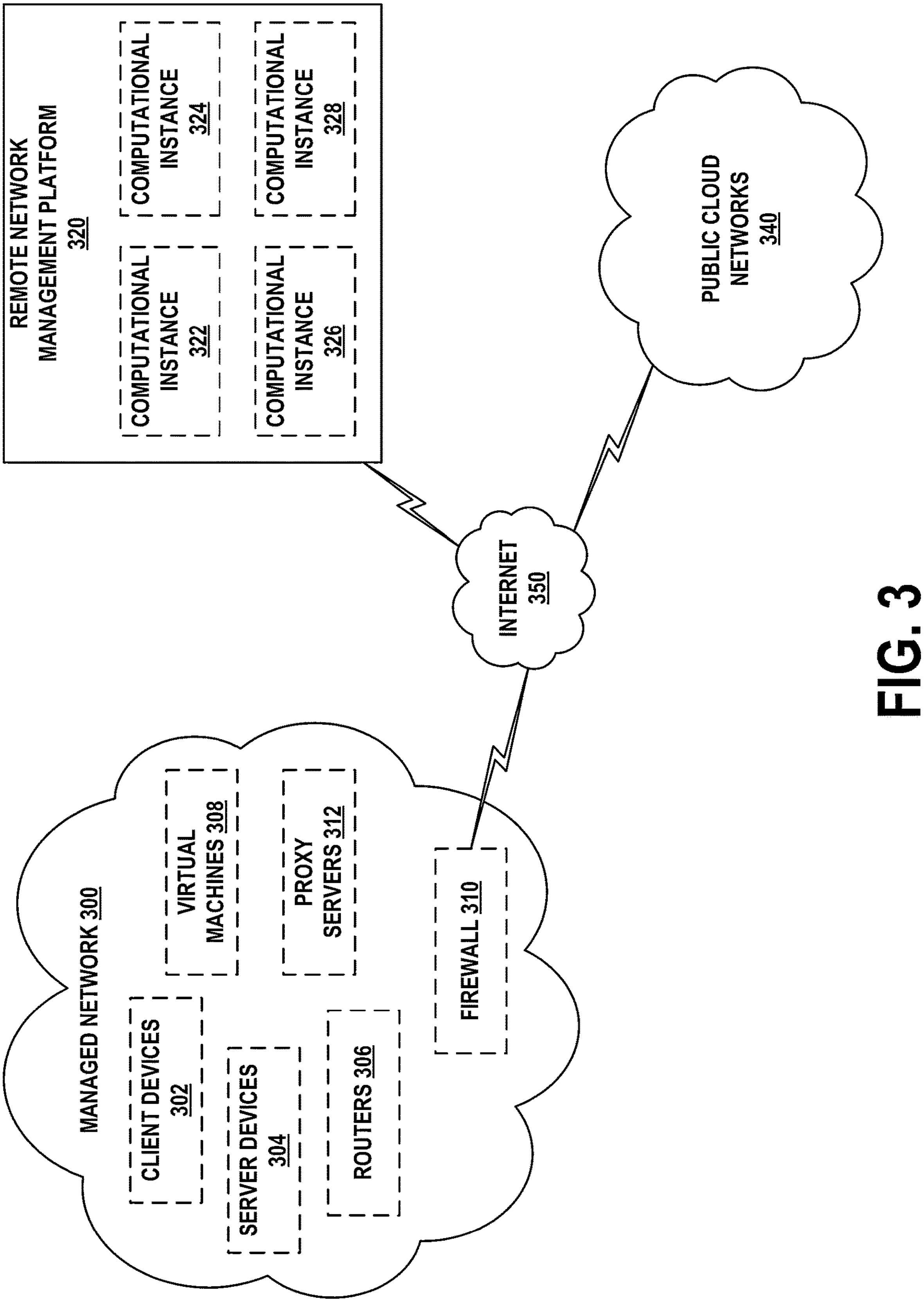
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components.

Possibly with the assistance of proxy servers 312, remote network management platform 320 may also be able to discover and manage aspects of public cloud networks 340 that are used by managed network 300. While not shown in FIG. 3, one or more proxy servers 312 may be placed in any of public cloud networks 340 in order to facilitate this discovery and management.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
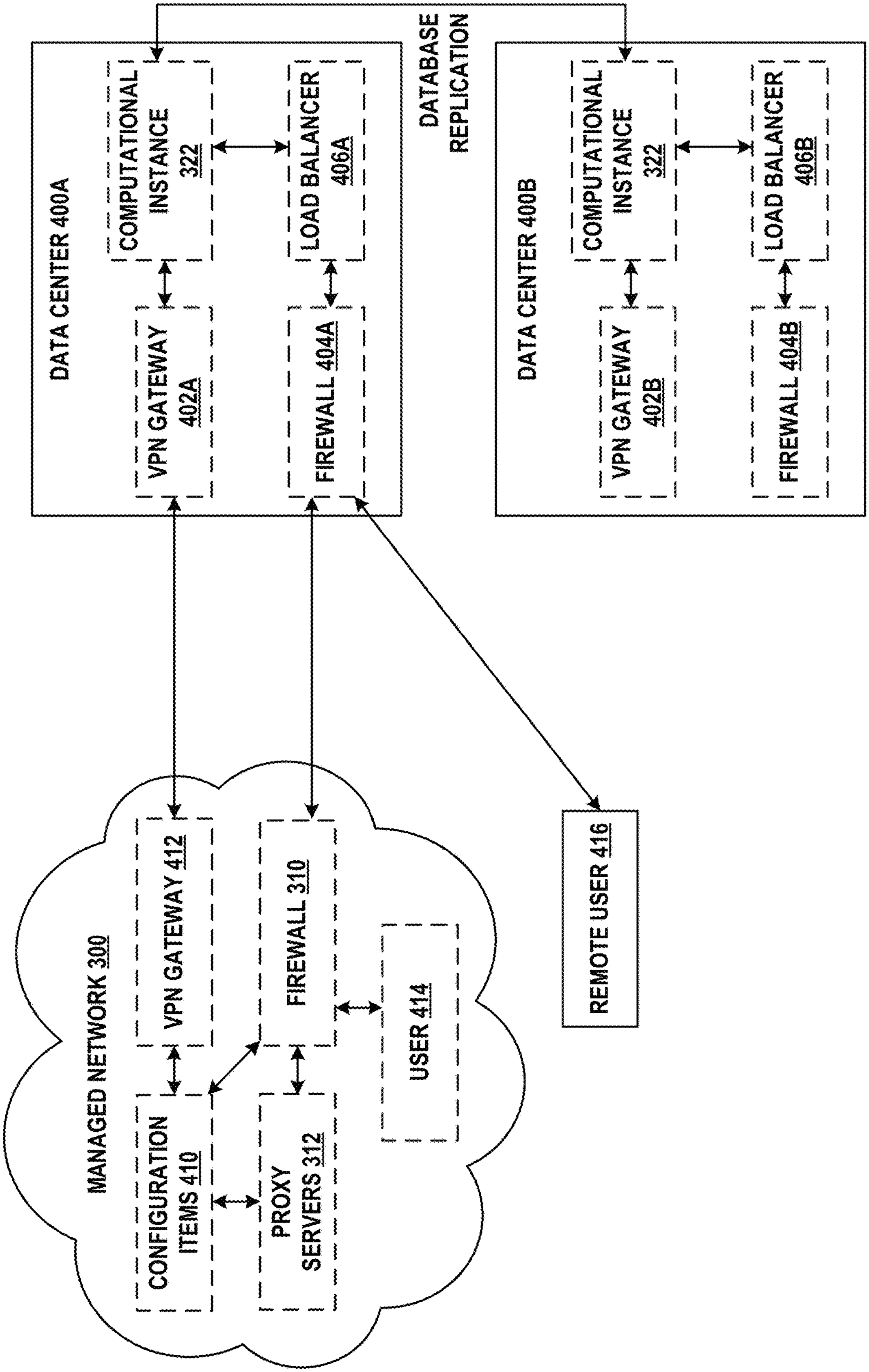
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any components thereof, any applications or services executing thereon, as well as relationships between devices, components, applications, and services. Thus, the term "configuration items" may be shorthand for part of all of any physical or virtual device, or any application or service remotely discoverable or managed by computational instance 322, or relationships between discovered devices, applications, and services. Configuration items may be represented in a configuration management database (CMDB) of computational instance 322.

As stored or transmitted, a configuration item may be a list of attributes that characterize the hardware or software that the configuration item represents. These attributes may include manufacturer, vendor, location, owner, unique identifier, description, network address, operational status, serial number, time of last update, and so on. The class of a configuration item may determine which subset of attributes are present for the configuration item (e.g., software and hardware configuration items may have different lists of attributes).

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively). In various alternatives, devices in managed network 300, such as proxy servers 312, may use a secure protocol (e.g., TLS) to communicate directly with one or more data centers.

IV. Example Discovery

In order for remote network management platform 320 to administer the devices, applications, and services of managed network 300, remote network management platform 320 may first determine what devices are present in managed network 300, the configurations, constituent components, and operational statuses of these devices, and the applications and services provided by the devices. Remote network management platform 320 may also determine the relationships between discovered devices, their components, applications, and services. Representations of each device, component, application, and service may be referred to as a configuration item. The process of determining the configuration items and relationships within managed network 300 is referred to as discovery, and may be facilitated at least in part by proxy servers 312. Representations of configuration items and relationships are stored in a CMDB.

While this section describes discovery conducted on managed network 300, the same or similar discovery procedures may be used on public cloud networks 340. Thus, in some environments, "discovery" may refer to discovering configuration items and relationships on a managed network and/or one or more public cloud networks.

For purposes of the embodiments herein, an "application" may refer to one or more processes, threads, programs, client software modules, server software modules, or any other software that executes on a device or group of devices. A "service" may refer to a high-level capability provided by one or more applications executing on one or more devices working in conjunction with one another. For example, a web service may involve multiple web application server threads executing on one device and accessing information from a database application that executes on another device.

Figure 5:
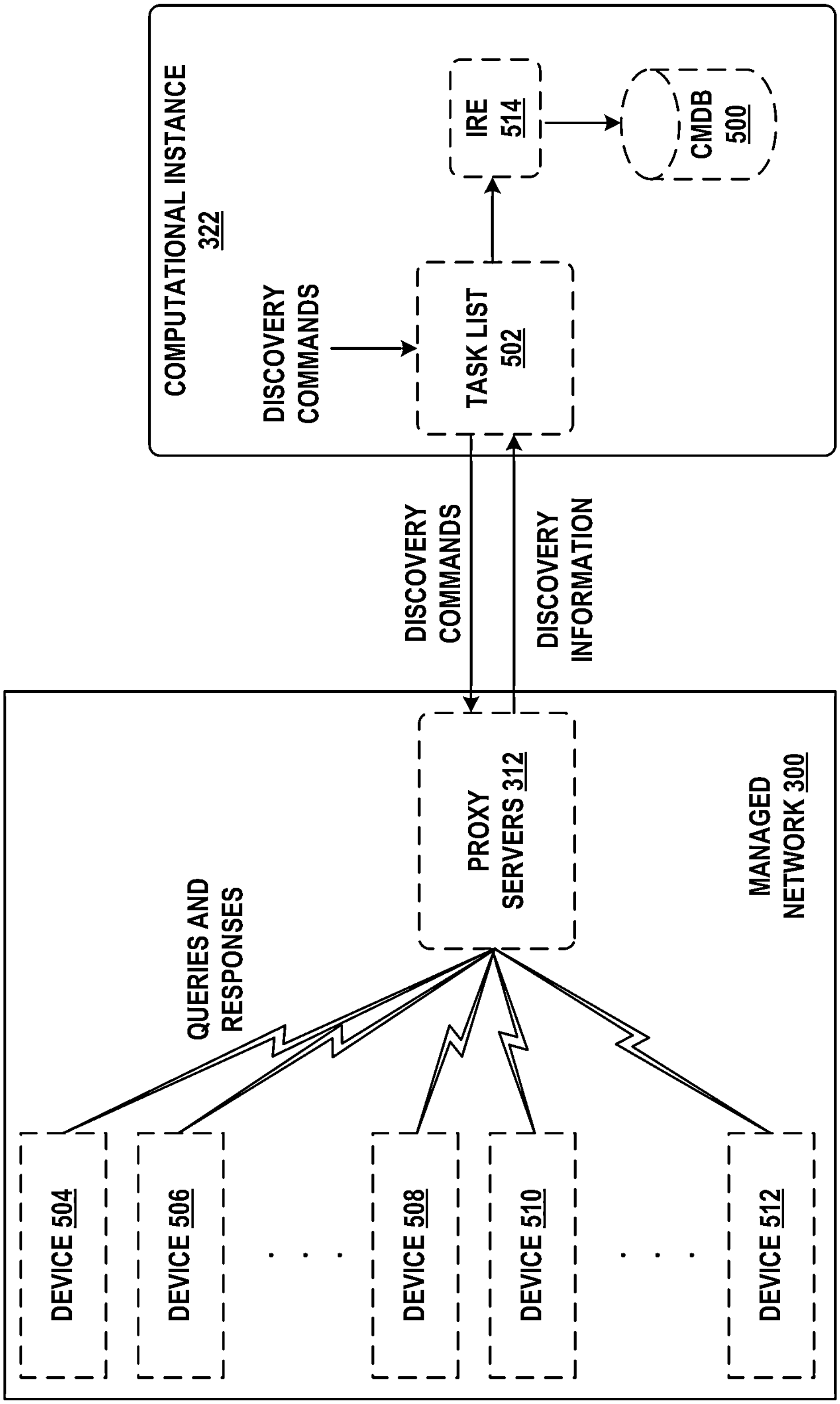
FIG. 5 depicts another communication environment involving a remote network management architecture, in accordance with example embodiments.

FIG. 5 provides a logical depiction of how configuration items and relationships can be discovered, as well as how information related thereto can be stored. For sake of simplicity, remote network management platform 320, public cloud networks 340, and Internet 350 are not shown.

In FIG. 5, CMDB 500, task list 502, and identification and reconciliation engine (IRE) 514 are disposed and/or operate within computational instance 322. Task list 502 represents a connection point between computational instance 322 and proxy servers 312. Task list 502 may be referred to as a queue, or more particularly as an external communication channel (ECC) queue. Task list 502 may represent not only the queue itself but any associated processing, such as adding, removing, and/or manipulating information in the queue.

As discovery takes place, computational instance 322 may store discovery tasks (jobs) that proxy servers 312 are to perform in task list 502, until proxy servers 312 request these tasks in batches of one or more. Placing the tasks in task list 502 may trigger or otherwise cause proxy servers 312 to begin their discovery operations. For example, proxy servers 312 may poll task list 502 periodically or from time to time, or may be notified of discovery commands in task list 502 in some other fashion. Alternatively or additionally, discovery may be manually triggered or automatically triggered based on triggering events (e.g., discovery may automatically begin once per day at a particular time).

Regardless, computational instance 322 may transmit these discovery commands to proxy servers 312 upon request. For example, proxy servers 312 may repeatedly query task list 502, obtain the next task therein, and perform this task until task list 502 is empty or another stopping condition has been reached. In response to receiving a discovery command, proxy servers 312 may query various devices, components, applications, and/or services in managed network 300 (represented for sake of simplicity in FIG. 5 by devices 504, 506, 508, 510, and 512). These devices, components, applications, and/or services may provide responses relating to their configuration, operation, and/or status to proxy servers 312. In turn, proxy servers 312 may then provide this discovered information to task list 502 (i.e., task list 502 may have an outgoing queue for holding discovery commands until requested by proxy servers 312 as well as an incoming queue for holding the discovery information until it is read).

IRE 514 may be a software module that removes discovery information from task list 502 and formulates this discovery information into configuration items (e.g., representing devices, components, applications, and/or services discovered on managed network 300) as well as relationships therebetween. Then, IRE 514 may provide these configuration items and relationships to CMDB 500 for storage therein. The operation of IRE 514 is described in more detail below.

In this fashion, configuration items stored in CMDB 500 represent the environment of managed network 300. As an example, these configuration items may represent a set of physical and/or virtual devices (e.g., client devices, server devices, routers, or virtual machines), applications executing thereon (e.g., web servers, email servers, databases, or storage arrays), as well as services that involve multiple individual configuration items. Relationships may be pairwise definitions of arrangements or dependencies between configuration items.

In order for discovery to take place in the manner described above, proxy servers 312, CMDB 500, and/or one or more credential stores may be configured with credentials for the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

There are two general types of discovery—horizontal and vertical (top-down). Each are discussed below.

A. Horizontal Discovery

Horizontal discovery is used to scan managed network 300, find devices, components, and/or applications, and then populate CMDB 500 with configuration items representing these devices, components, and/or applications. Horizontal discovery also creates relationships between the configuration items. For instance, this could be a "runs on" relationship between a configuration item representing a software application and a configuration item representing a server device on which it executes. Typically, horizontal discovery is not aware of services and does not create relationships between configuration items based on the services in which they operate.

There are two versions of horizontal discovery. One relies on probes and sensors, while the other also employs patterns. Probes and sensors may be scripts (e.g., written in JAVASCRIPT®) that collect and process discovery information on a device and then update CMDB 500 accordingly. More specifically, probes explore or investigate devices on managed network 300, and sensors parse the discovery information returned from the probes.

Patterns are also scripts that collect data on one or more devices, process it, and update the CMDB. Patterns differ from probes and sensors in that they are written in a specific discovery programming language and are used to conduct detailed discovery procedures on specific devices, components, and/or applications that often cannot be reliably discovered (or discovered at all) by more general probes and sensors. Particularly, patterns may specify a series of operations that define how to discover a particular arrangement of devices, components, and/or applications, what credentials to use, and which CMDB tables to populate with configuration items resulting from this discovery.

Both versions may proceed in four logical phases: scanning, classification, identification, and exploration. Also, both versions may require specification of one or more ranges of IP addresses on managed network 300 for which discovery is to take place. Each phase may involve communication between devices on managed network 300 and proxy servers 312, as well as between proxy servers 312 and task list 502. Some phases may involve storing partial or preliminary configuration items in CMDB 500, which may be updated in a later phase.

In the scanning phase, proxy servers 312 may probe each IP address in the specified range(s) of IP addresses for open Transmission Control Protocol (TCP) and/or User Datagram Protocol (UDP) ports to determine the general type of device and its operating system. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist.

In the classification phase, proxy servers 312 may further probe each discovered device to determine the type of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the specific type of operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 10, as a set of WINDOWS®-10-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500 along with any relevant relationships therebetween. Doing so may involve passing the identification information through IRE 514 to avoid generation of duplicate configuration items, for purposes of disambiguation, and/or to determine the table(s) of CMDB 500 in which the discovery information should be written.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (software applications), and so on. Once more, the discovered information may be stored as one or more configuration items in CMDB 500, as well as relationships.

Running horizontal discovery on certain devices, such as switches and routers, may utilize SNMP. Instead of or in addition to determining a list of running processes or other application-related information, discovery may determine additional subnets known to a router and the operational state of the router's network interfaces (e.g., active, inactive, queue length, number of packets dropped, etc.). The IP addresses of the additional subnets may be candidates for further discovery procedures. Thus, horizontal discovery may progress iteratively or recursively.

Patterns are used only during the identification and exploration phases—under pattern-based discovery, the scanning and classification phases operate as they would if probes and sensors are used. After the classification stage completes, a pattern probe is specified as a probe to use during identification. Then, the pattern probe and the pattern that it specifies are launched.

Patterns support a number of features, by way of the discovery programming language, that are not available or difficult to achieve with discovery using probes and sensors. For example, discovery of devices, components, and/or applications in public cloud networks, as well as configuration file tracking, is much simpler to achieve using pattern-based discovery. Further, these patterns are more easily customized by users than probes and sensors. Additionally, patterns are more focused on specific devices, components, and/or applications and therefore may execute faster than the more general approaches used by probes and sensors.

Once horizontal discovery completes, a configuration item representation of each discovered device, component, and/or application is available in CMDB 500. For example, after discovery, operating system version, hardware configuration, and network configuration details for client devices, server devices, and routers in managed network 300, as well as applications executing thereon, may be stored as configuration items. This collected information may be presented to a user in various ways to allow the user to view the hardware composition and operational status of devices.

Furthermore, CMDB 500 may include entries regarding the relationships between configuration items. More specifically, suppose that a server device includes a number of hardware components (e.g., processors, memory, network interfaces, storage, and file systems), and has several software applications installed or executing thereon. Relationships between the components and the server device (e.g., "contained by" relationships) and relationships between the software applications and the server device (e.g., "runs on" relationships) may be represented as such in CMDB 500.

More generally, the relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

In this manner, remote network management platform 320 may discover and inventory the hardware and software deployed on and provided by managed network 300.

B. Vertical Discovery

Vertical discovery is a technique used to find and map configuration items that are part of an overall service, such as a web service. For example, vertical discovery can map a web service by showing the relationships between a web server application, a LINUX® server device, and a database that stores the data for the web service. Typically, horizontal discovery is run first to find configuration items and basic relationships therebetween, and then vertical discovery is run to establish the relationships between configuration items that make up a service.

Patterns can be used to discover certain types of services, as these patterns can be programmed to look for specific arrangements of hardware and software that fit a description of how the service is deployed. Alternatively or additionally, traffic analysis (e.g., examining network traffic between devices) can be used to facilitate vertical discovery. In some cases, the parameters of a service can be manually configured to assist vertical discovery.

In general, vertical discovery seeks to find specific types of relationships between devices, components, and/or applications. Some of these relationships may be inferred from configuration files. For example, the configuration file of a web server application can refer to the IP address and port number of a database on which it relies. Vertical discovery patterns can be programmed to look for such references and infer relationships therefrom. Relationships can also be inferred from traffic between devices—for instance, if there is a large extent of web traffic (e.g., TCP port 80 or 8080) traveling between a load balancer and a device hosting a web server, then the load balancer and the web server may have a relationship.

Relationships found by vertical discovery may take various forms. As an example, an email service may include an email server software configuration item and a database application software configuration item, each installed on different hardware device configuration items. The email service may have a "depends on" relationship with both of these software configuration items, while the software configuration items have a "used by" reciprocal relationship with the email service. Such services might not be able to be fully determined by horizontal discovery procedures, and instead may rely on vertical discovery and possibly some extent of manual configuration.

C. Advantages of Discovery

Regardless of how discovery information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

In another example, suppose that a database application is executing on a server device, and that this database application is used by an employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular hardware device fails.

In general, configuration items and/or relationships between configuration items may be displayed on a web-based interface and represented in a hierarchical fashion. Modifications to such configuration items and/or relationships in the CMDB may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

V. CMDB Identification Rules and Reconciliation

A CMDB, such as CMDB 500, provides a repository of configuration items and relationships. When properly provisioned, it can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information including configuration items and relationships in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API) of IRE 514. Then, IRE 514 may use a set of configurable identification rules to uniquely identify configuration items and determine whether and how they are to be written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to IRE 514, IRE 514 may attempt to match the information with one or more rules. If a match is found, the configuration item is written to the CMDB or updated if it already exists within the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, IRE 514 might only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by IRE 514 or in another fashion. These configuration items may be deleted or flagged for manual de-duplication.

VI. Discovery Command Validation Tool

Discovery procedures, such as those discussed herein, dramatically ease the maintenance and operation of various types of IT systems. Nonetheless, these systems are growing in complexity and are often customized in a fashion that makes them impossible or inefficient to discover using traditional patternless discovery. Thus, patterns have grown in importance and usage over the last few years.

An example of the power and utility of pattern-based discovery can be appreciated in the context of virtual machine clusters. As virtual machines may be spun up (activated) or spun down (deactivated) over time in such clusters, it may be difficult for traditional discovery procedures to locate and probe each of these virtual machines. However, most virtual machine clustering technologies use some form of control node (e.g., a hypervisor) that manages the virtual machines. The control node may be aware of the number and location of these virtual machines, their roles, their redundancy scheme, and so on. The control node may also be able to query each virtual machine to determine this information or real-time performance data, such as uptime, load, utilization, or other factors. To do so, the control node may be configured with a command line or representational state transfer (REST) interface through which commands can be received.

In this case, discovery of the virtual machine cluster may involve accessing the control node by way of its interface and querying information relating to its supported virtual machines. Doing so might require that the control node is reachable by the discovery infrastructure (e.g., by a proxy server), that the proper credentials (e.g., userid and password) are provided to the control node, that these credentials are authorized to carry out any commands issued to the control node, and that the commands are properly formatted. If any of these requirements are not met, discovery is very likely to fail. Thus, it is advantageous for patterns to be properly tested or validated before being deployed.

In some cases, discovery patterns contain lists of commands intended to be carried out in a given order, possibly due to dependencies between commands. In the example of a control node of a virtual machine cluster, an initial command might request a list of virtual machines managed by the control node and subsequent commands might request details regarding each virtual machine. If commands earlier in the ordering fail, the pattern as a whole may terminate without even attempting to carry out the subsequent commands. Thus, some discovery pattern failures result in some commands never executing, leaving their validity in an indeterminate state.

Figure 6A:
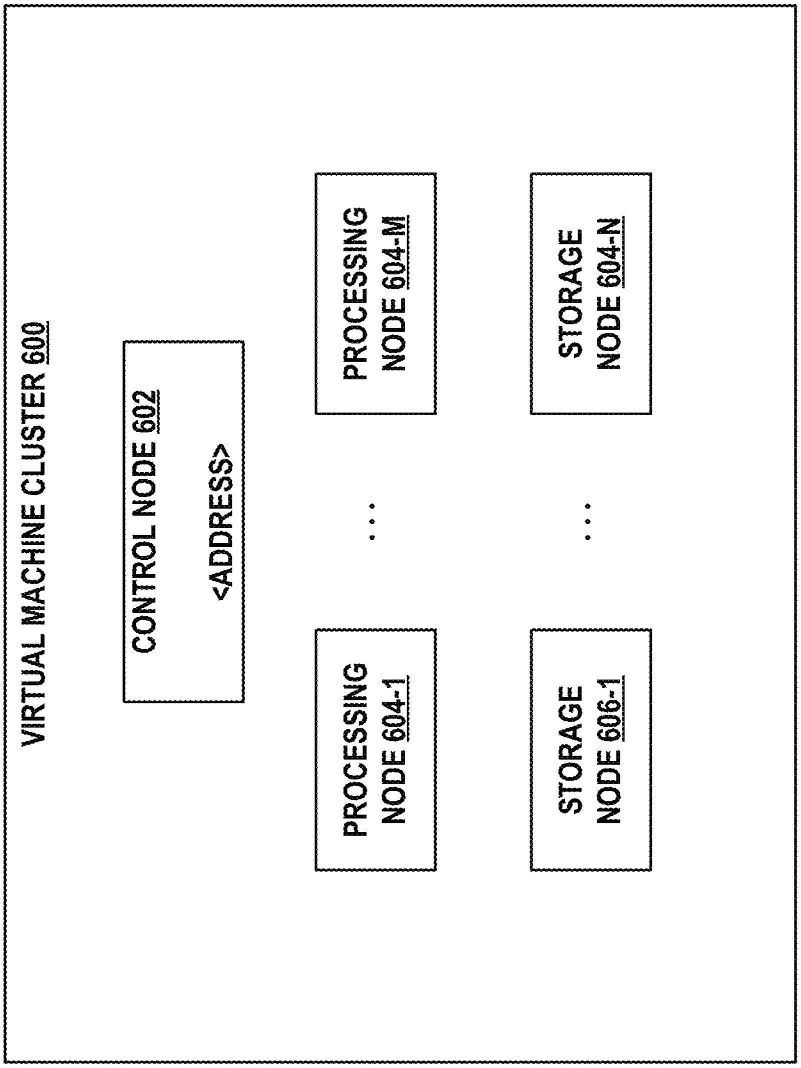
FIG. 6A depicts a virtual machine cluster, in accordance with example embodiments.

As an example, FIG. 6A depicts virtual machine cluster 600. It includes control node 602, as well as M processing nodes (labeled with reference numerals 604-1 through 604-M) and N storage nodes (labeled with reference numerals 606-1 through 606-N). The processing nodes and storage nodes are assumed to be virtual machines. The use of ellipses indicates that M and N may take on any value greater than or equal to 1.

Control node 602 may be a hypervisor, for example, that uses the network address indicated by <address>. This network address could be an IP address (e.g., IPv4 or IPv6) or any other type of network address. In the description below, IP addresses are used for sake of simplicity, but the embodiments herein are not limited in this manner.

Control node 602 may dynamically manage processing nodes 604-1 through 604-M and storage nodes 606-1 through 606-N. The values of M and N at any given time may be based on actual demand, expected demand, historical demand, or other factors. Further, processing nodes 604-1 through 604-M may use a redundancy scheme with some number of operating virtual machines and one or more idle virtual machines preparing to take over the role of an operating virtual machine should that operating virtual machine fail, get deactivated or otherwise become unable to perform its tasks. Likewise, storage nodes 606-1 through 606-N may employ a similar redundancy mechanism.

These processing and storage nodes may be capable of determining various characteristics related to their uptime, load, utilization, and so on. Further, it is assumed that each processing and storage node has a unique identifier with which it can be referenced by control node 602.

FIG. 6B depicts discovery pattern 610 for discovering the components of virtual machine cluster 600. This pattern is presented at a high level for sake of simplicity. Actual discovery patterns may be written in a discovery programming language that has commands and execution flow control capabilities (e.g., branching and looping) that resemble established scripting languages.

Further, the commands of discovery pattern 610 may be formatted and communicated by way of a command line interface, REST interface, SNMP interface, or Windows Management Instrumentation (WMI) interface. Other types of interfaces may be supported instead or in addition to any of these interfaces. Depending on system requirements, the same or different credentials could appear in each command. Alternatively, some commands might not require credentials.

Command 1 of discovery pattern 610 causes a computing device (e.g., a proxy server) to log on to network address <address> with credentials <credentials>. As noted above, <address> may be the IP address of control node 602, and <credentials> may be a userid/password pair or some other form of authentication token that allows access to control node 602.

Command 2 causes the computing device to request a list of processing nodes from control node 602. This list may include the unique identifiers for each of processing nodes 604-1 through 604-M.

Command 3 causes the computing device to request the uptime and load of each of processing nodes 604-1 through 604-M in the list. For instance, command 3 may effectively be multiple commands for each processing node (e.g., a "get uptime" and a "get load" command for each processing node in the list).

Command 4 causes the computing device to request a list of storage nodes from control node 602. This list may include the unique identifiers for each of storage nodes 606-1 through 606-N.

Command 5 causes the computing device to request the utilization of each of storage nodes 606-1 through 606-N in the list. For instance, command 5 may effectively be one command for each storage node (e.g., a "get utilization" command for each processing node in the list).

Other commands not shown may be employed to determine relationships between the nodes of virtual machine cluster 600 and/or to obtain other information from any of the nodes. Further, additional commands may write the results from commands 2-5, as well as any information inferred therefrom, into various database tables (e.g., of a CMDB).

Since discovery is typically executed relatively infrequently (e.g., once every few hours, once per day, once per week, etc.), debugging patterns through discovery procedures is a lengthy process that can take days or even weeks. Pattern failures might not clearly identify the cause of the failure. Further, modifications intended to fix defects in a pattern are not guaranteed to address this cause, and could even introduce additional defects that are not found until later discovery executions.

The embodiments herein address these and possibly other limitations by introducing a validation tool for discovery commands. In its essence, the validation tool is software that takes a list of one or more discovery commands (e.g., manually entered or parsed from a discovery pattern) as well as lists of one or more network addresses per discovery command. Parsing discovery commands from a pattern may involve iterating through the pattern, identifying commands therein (e.g., based on syntax and/or keywords) and extracting these commands. Advantageously, the parsing can be carried out dynamically each time the validation tool is used, so that changes to the pattern are automatically incorporated into the validation tool's processes.

The validation tool then attempts to carry out each discovery command on each network address in its associated list, and reports the result of doing so for each command/address pair. These results may include indications of success (e.g., a Boolean value representing successful execution of a command, a response code, command output, other text, etc.) or indications of failure (e.g., a Boolean value representing unsuccessful execution of a command, an error code, command output, other text, etc.). In some embodiments, a common list of network addresses may be used with all discovery commands.

As noted, discovery patterns are not required. The validation tool can be run on one or more related or unrelated discovery commands that do not appear in a discovery pattern.

Herein a validation tool may also be referred to as a "discovery validation application", a "validation application", or by some other name. Such a validation tool may include software configured to execute on a remote network management platform or possibly some other type of platform.

The validation tool is intended to be used before a pattern is added to scheduled discovery procedures, and independently of these procedures. For instance, a user may test commands from a pattern on a list of IP addresses, debug the pattern as needed, ultimately determine that the pattern is working as expected, and then deploy the pattern for the next scheduled discovery procedure. But the validation tool can also be used on deployed patterns in attempts to reproduce any failures. Regardless, the validation tool provides results much more rapidly than discovery procedures (e.g., in seconds or minutes rather than days) and therefore dramatically improves the ability to develop, test, and successfully deploy patterns.

Figure 7:
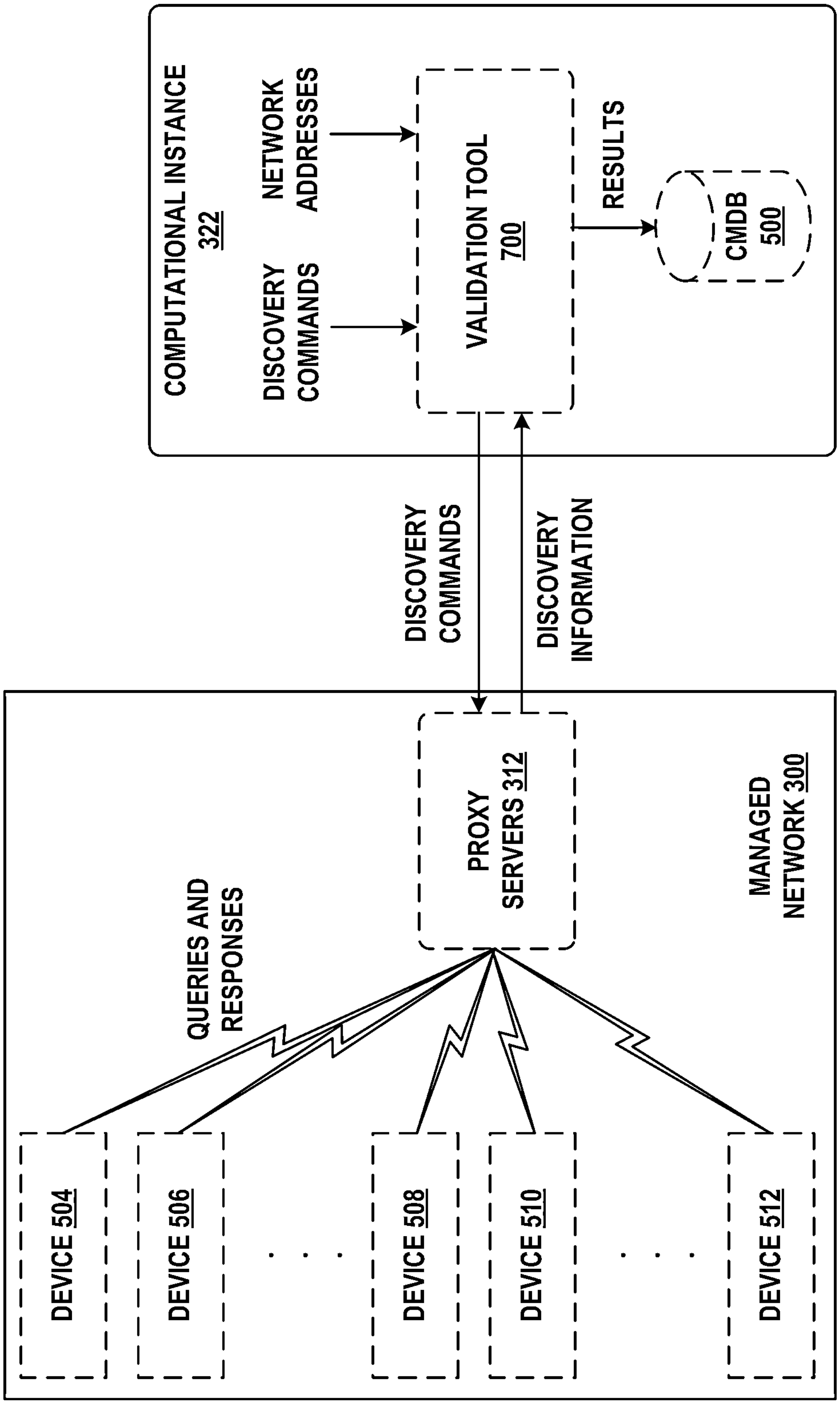
FIG. 7 depicts a communication environment involving a remote network management architecture hosting a validation tool, in accordance with example embodiments.

FIG. 7 depicts an example architecture in which validation tool 700 is configured to execute within computational instance 322. This architecture is essentially the same as that of FIG. 5, except that it shows validation tool 700 and does not show task list 502 or IRE 514. Notably, validation tool 700 takes discovery commands and network addresses as input, transmits representations of the discovery commands and network addresses to one of proxy servers 312, receives discovery information from this proxy server, and provides results to CMDB 500. Proxy servers 312 may apply discovery commands to network addresses by way of the appropriate discovery interface. As noted, each discovery command could be applied to the same or a different list of one or more network addresses. Moreover, use of proxy servers is not required in some environments, and the validation tool may communicate in a more direct fashion with computing devices on which discovery is executed.

In FIG. 7, discovery commands may take the form of individual commands, lists of commands or entire discovery patterns, for example. Network addresses may be a list of such addresses. Using the example of IP addresses, network addresses may be a single IP address (e.g., "10.172.43.167"), a list of IP addresses (e.g., "10.172.43.167", "10.172.43.168", "10.172.44.17"), or a range of IP addresses (e.g., "10.172.43.0-10.172.43.255" or "10.172.43/24").

As noted above, the types of discovery failures that can be detected by validation tool 700 include unreachable network addresses, authentication failures, authorization failures, and/or unsupported commands. Additional types of failures may be detected as well.

A network address may be deemed unreachable when one or more attempts to issue a command to a computing device purportedly at that address is unsuccessful. The reasons for such a failure could include the address not being in use, the address not being routable from the proxy server issuing the command, a typographical error in how the address is specified to the validation tool, or that a computing device at the address not responding the attempts. Unreachable network addresses are typically detected when one or more attempts to issue commands do not receive a response, or these commands receive a response from a nearby router or switch indicating that the router or switch does not know how to forward the commands to the network address. Alternatively, a proxy server (e.g., one of proxy servers 312) might be unreachable from the validation tool (e.g., validation tool 700).

Authentication failures occur when the network address is reachable but the provided credentials are not accepted by the computing device at the address. For instance, the credentials may not have been configured on the computing device. In some cases, an authentication failure occurs when credentials are required for a command to be executed by the computing device at the address but no credentials were provided. Authentication failures are typically detected by validation tool 700 receiving error messages indicating that authentication has failed for issued commands.

Authorization failure, in contrast to authentication failure, occurs when a command is successfully authenticated (if such authentication is needed) by the computing device at the address, but the account or userid from which the command is issued does not have permission to execute the command. For instance, validation tool 700 might have logged into a non-privileged account, but the command (e.g., the UNIX "sudo" command) can only be executed by privileged (e.g., superuser or root) accounts. Authorization failures are detected by validation tool 700 receiving error messages indicating that authorization has failed for issued commands.

Unsupported commands include commands that are not supported by the computing device at the address, as well as unsupported options or parameters for supported commands. Commands with typographical errors are one possible example of unsupported commands. Unsupported commands are detected by validation tool 700 receiving error messages indicating that issued commands resulted in an indication that they were not found or unknown. Note that the validation tool might not know whether a command is unsupported, and might only be informed when this is the case by receiving an error message. On the other hand, the validation tool could be configured with a list of supported commands and proactively flag errors for commands not in this list.

In some cases, the validation tool may read the discovery commands and network addresses from tables within a database (e.g., CMDB 500). Additionally, the validation tool might write to temporary tables within a database (e.g., CMDB 500) that are configured to store the results and/or specific discovery information.

Figure 8:
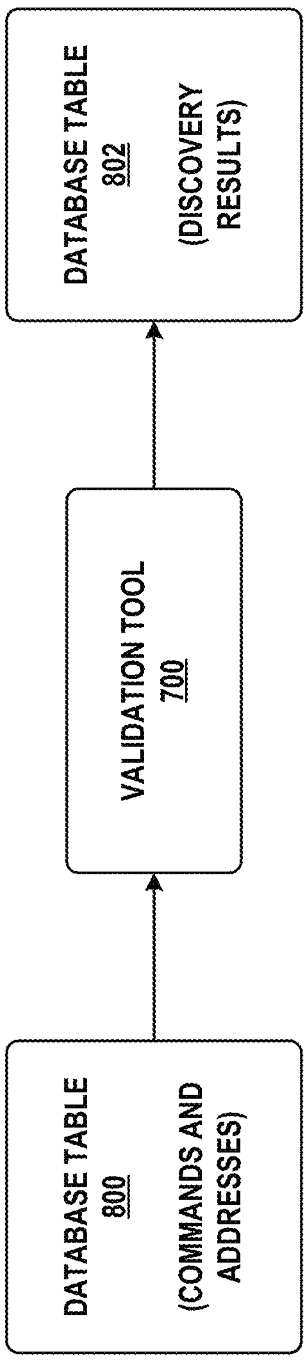
FIG. 8 depicts a validation tool interacting with database tables, in accordance with example embodiments.

As an example, FIG. 8 depicts validation tool 700 reading discovery commands and network addresses from database table 800 and writing the corresponding discovery results to database table 802. Database table 800 and database table 802 may be part of the same database (e.g., CMDB 500) or different databases.

An example of a possible schema for database table 800 is shown in Table 1. For instance, each entry in database table 800 might include some of the attributes listed in Table 1 (i.e., number, ip_address, os_class, command_type, command, proxy_server, progress, status, credentials, and/or is_automated). Each of these attributes is specified in Table 1 in terms of its name, label, type, and description. Examples are provided for some attributes.

The number attribute may be a unique identifier of the entry. The ip_address attribute may specify one or more IP addresses. The os_class attribute may specify the type of operating system on which the command is to be executed. The command_type attribute may specify whether the command is to be delivered by way of shell (CLI), SNMP, WMI, or HTTP GET (e.g., via a web-based REST interface). The command attribute may specify the actual command to issue to the IP addresses. The proxy_server attribute may specify the proxy server through which to route the command (if no proxy server is specified, the default proxy server may be used). The progress attribute may specify, for an executing command, what percentage of results have been received. The status attribute may specify whether the command execution is complete and all results have been received. The credentials attribute may specify a reference to a set of credentials stored in another database table. The is_automated attribute may specify whether automated command

TABLE 1

| Name | Label | Type | Description | Examples |
|---|---|---|---|---|
| number | Number | Auto number | Unique number automatically generated for display purposes | CRT00001, CRT00002 etc. |
| ip_addresses | IP addresses | String | A single, list or range of IP addresses | 10.196.39.244, 10.196.39.213-10.196.39.244 |
| os_class | Operating system class | Table name | The class of the operating system to execute the command on | Windows server, Linux server, etc. |
| command_type | Command type | Choice list | Type of command to run | Shell command, SNMP query, SNMP walk, WMI query, HTTP GET |
| command | Command | String | Command to run based on type | Sudo netstat -anp, 1.3.5.3.1.2.34.5, http://www.example.com/abc123/, HKEY_LOCAL_MACHINE\SOFTWARE\Microsoft\InetStp\VersionString |
| proxy_server | Proxy server | Reference (to ecc_agent) | Proxy server on which to run the command. Empty values means pick any proxy server based on the proxy server selection algorithm. | |
| progress | Progress | Percent complete | Will show progress calculated from the state of the result records. | |
| status | Status | Choice | Status of execution lifecycle. | Active, complete etc. |
| credentials | Credentials | Reference (tc discovery credentials) | The specific credentials to use for this command validation. If empty-use default behavior. | |
| is_automated | Run automated command validation | Boolean | Whether to run automated command validation or ask for the command as iuser nput. | |

validation is used (to parse commands from a pattern) or the commands are provided as user input.

Notably, Table 1 is just an example of the types of attributes possible. In various embodiments, more or fewer attributes may be present.

TABLE 2

| Name | Label | Type | Description | Examples |
| --- | --- | --- | --- | --- |
| command_validation | Command validation | Reference to command | Reference to entry in database table 800 | |
| ip_address | IP address | String | IP address on which the command was run | |
| os_class | Operating system class | Table name | The class of the operating system on which to execute the command | Windows server, Linux server, etc. |
| command_type | Command type | Choice | The type of command which was executed | Shell command, SNMP query, SNMP walk, WMI query, HTTP GET |
| command | Command | String | The command that was executed | Sudo netstat -anp, 1.3.5.3.1.2.34.5, http://www.example.com/abc123/, HKEY_LOCAL_MACHINE\SOFTWARE\Microsoft\InetStp\VersionString |
| proxy_server | Proxy server | Reference to ecc_agent | The proxy server chosen to run the command | |
| state | State | Choice | Command execution state | Pending, processing, done |
| result | Result | String (or choice) | Command execution result | Success, failure |
| result_details | Result details | String | Details of the result | In case of failure: reason for failure, such as: Command not found, empty result, timed out, permission issues. In case of success: show the output (trimmed, if needed) |
| error_code | Error code | String | An error code selected from a predefined list, if applicable. The error codes are accompanied by troubleshooting suggestions. | EC001-address not reachable. |

An example of a possible schema for database table 802 is shown in Table 2. For instance, each entry in database table 802 might include some of the attributes listed in Table 2 (i.e., command_validation, ip_address, os_class, command_type, command, proxy_server, state, result, result_details, and/or steps_to_remediate). Each of these attributes is specified in Table 2 in terms of its name, label, type, and description. Examples are provided for some attributes.

Notably, a single entry in database table 800 may produce multiple entries in database table 802 based on the number of IP addresses on which a command is to be executed. For example, if an entry in database table 800 specifies that a command is to be executed on 10 IP addresses, this will result in 10 entries (one per each of these IP addresses) to be present in database table 802.

The command_validation attribute may specify an entry in database table 800 that contains the command and the IP address of the computing device on which the command was executed that produced this result. The ip_address attribute may specify the IP address of the computing device on which the command was executed. The os_class attribute may specify the type of operating system of this computing device. The command_type attribute may specify how the command was delivered, such as shell (CLI), SNMP, WMI, or HTTP GET (e.g., via a web-based REST interface). The command attribute may specify the actual command that was issued. The proxy_server attribute may specify the proxy server through which the command was routed. The state attribute may specify whether the command is waiting to be processed on the IP address, being processed on the IP address, or completed processing on the IP address. The result attribute may specify whether execute of the command was successful or failed. The result_details attribute may specify a reason for the failure (if the command failed) or an indication of the command's output (if the command was successful). The steps_to_remediate attribute may specify or link to a description of what can be done to address any failure that was encountered (if such information is available).

Like Table 1, Table 2 is just an example of the types of attributes possible. In various embodiments, more or fewer attributes may be present.

Figure 9:
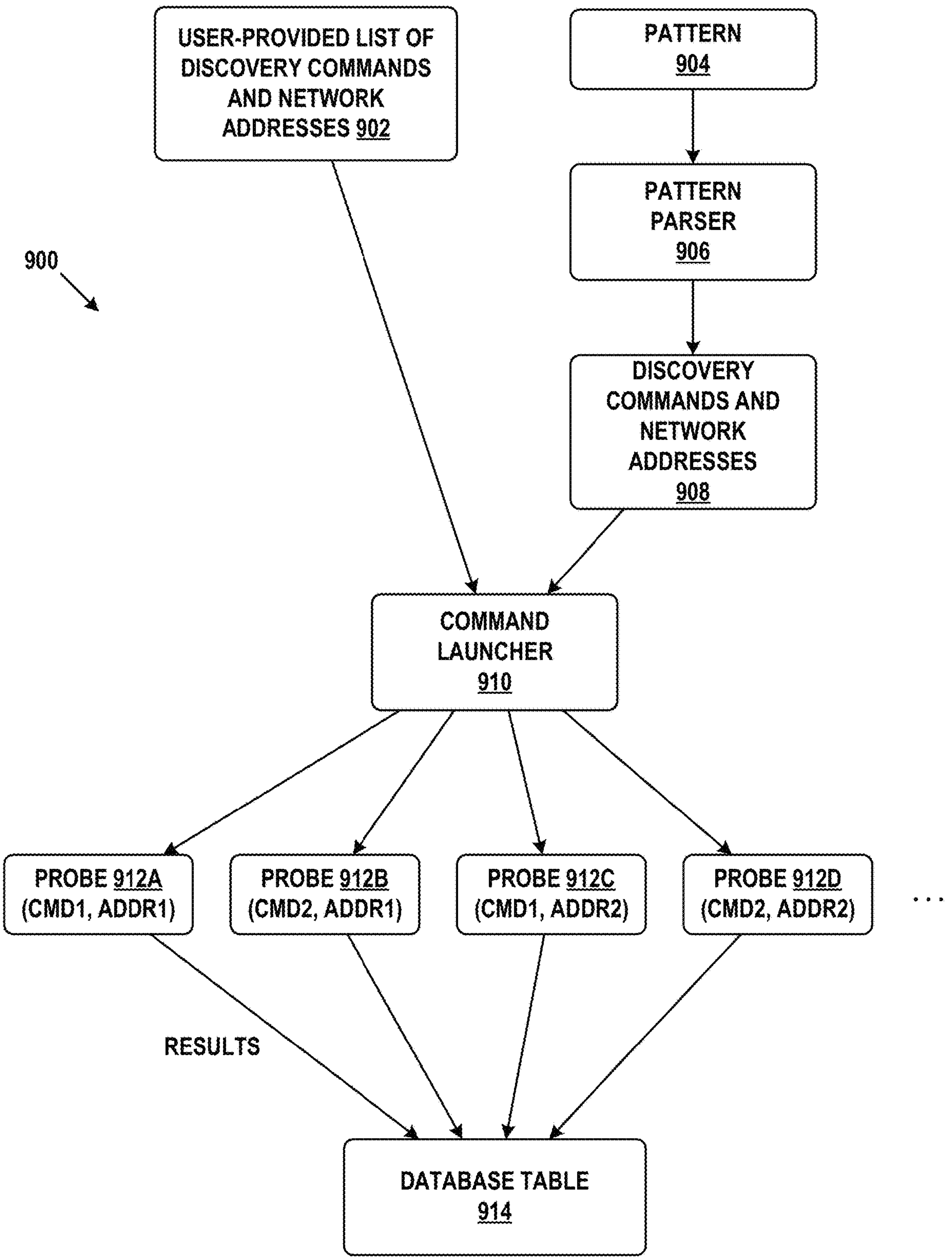
FIG. 9 depicts operation of a validation tool, in accordance with example embodiments.

FIG. 9 depicts the operation of a validation tool that puts these features together. Process 900 involves command launcher 910 receiving user-provided list of discovery commands and network addresses 902 and/or discovery commands and network addresses 908 that were extracted from pattern 904 by pattern parser 906.

Command launcher 910 launches a series of probes 912A, 912B, 912C, and 912D by transmitting the discovery commands to the network addresses (e.g., by way of a proxy server). Thus, for example, probe 912A transmits command cmd1 to network address addr1, probe 912B transmits command cmd2 to network address addr1, probe 912C transmits command cmd1 to network address addr2, and probe 912D transmits command cmd2 to network address addr2. As indicates by the ellipsis, more probes may be used.

In line with the discussion above, if command launcher 910 receives i commands and j addresses, i×j probes may be used. Alternatively, some commands may be associated with their own lists of addresses, so probes for each of these commands may only be used for each of their associated addresses.

Furthermore, each probe may be accompanied by or associated with a sensor (not shown in FIG. 9) that is configured to receive and parse the results of the execution or attempted execution of the commands, and write these results database table 914. Here, database table 914 may be identical to and/or encompass the role of database table 802.

VII. Example Operations

Figure 10:
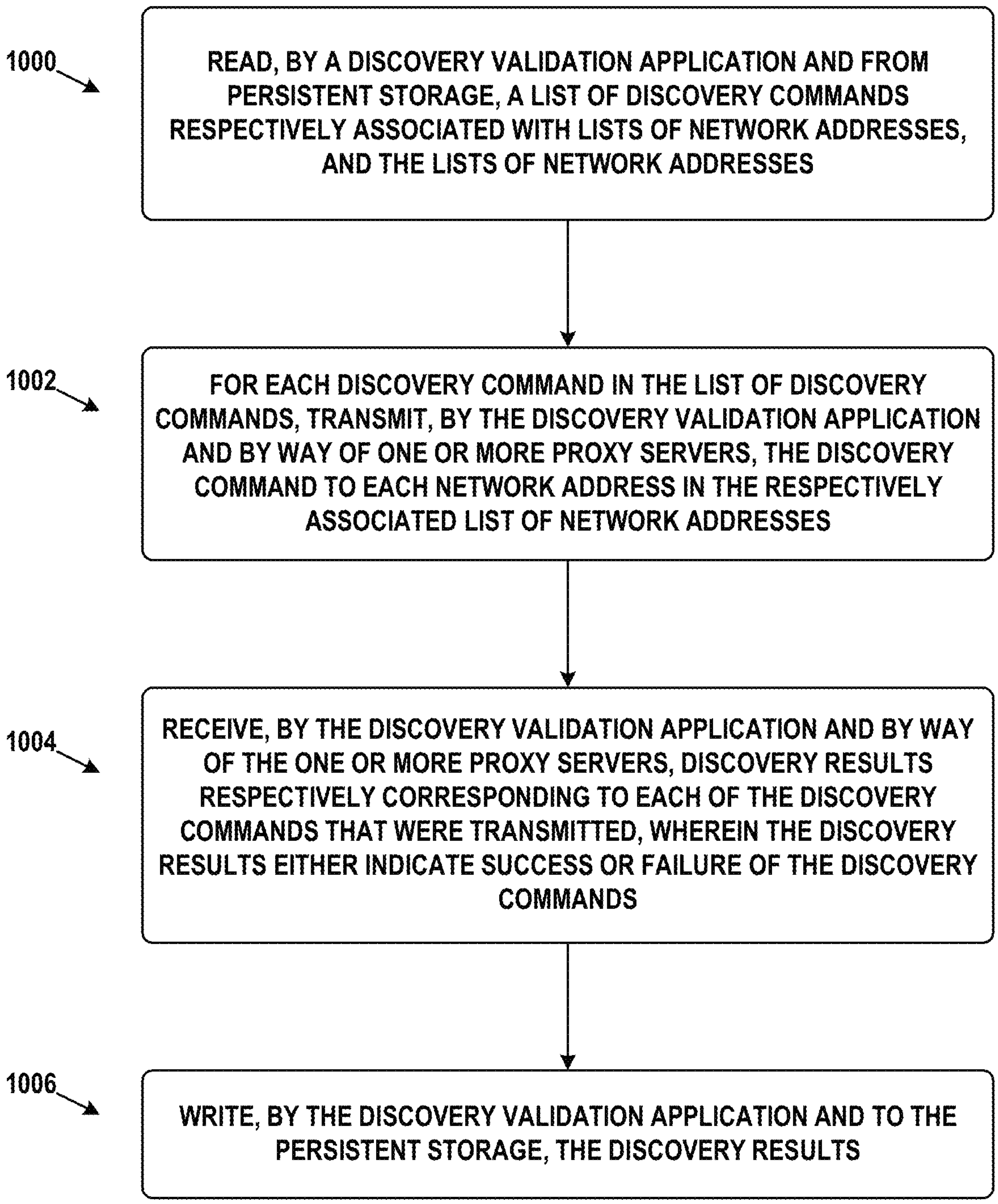
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve reading, by a discovery validation application and from persistent storage, a list of discovery commands respectively associated with lists of network addresses, and the lists of network addresses. Block 1002 may involve, for each discovery command in the list of discovery commands, transmitting, by the discovery validation application and by way of one or more proxy servers, the discovery command to each network address in the respectively associated list of network addresses. Block 1004 may involve receiving, by the discovery validation application and by way of the one or more proxy servers, discovery results respectively corresponding to each of the discovery commands that were transmitted, wherein the discovery results either indicate success or failure of the discovery commands. Block 1006 may involve writing, by the discovery validation application and to the persistent storage, the discovery results.

In some embodiments, the discovery validation application executes independently of any discovery procedures scheduled to be performed by the system.

In some embodiments, the lists of network addresses are specified as a common list of network addresses associated with each of the discovery commands.

In some embodiments, each of the discovery commands is one of a command line interface command, a simple network management protocol (SNMP) command, a command deliverable by way of a web-based interface, or a Windows Management Instrumentation (WMI) command.

In some embodiments, the discovery commands and the network addresses are stored in a first database table within the persistent storage, wherein the discovery results are stored within a second database table within the persistent storage.

In some embodiments, each entry of the first database table includes indications of a class of operating system on which a particular discovery command is to be executed, a type of the particular discovery command specifying a network protocol used to deliver the particular discovery command, one of the proxy servers through which the particular discovery command is to be transmitted, or authentication credentials to use with the particular discovery command.

In some embodiments, each entry of the discovery results in the second database table includes a specification of a particular discovery command that was executed, the network address to which the particular discovery command was transmitted, or a proxy server through which the particular discovery command was transmitted.

In some embodiments, the discovery validation application is configured to transmit the discovery commands in sequential batches. Each batch may contain, for example, 5-25 discovery command/network address pairs.

In some embodiments, the list of discovery commands has an ordering, wherein the discovery validation application is configured to transmit the discovery commands per associated network address in accordance with the ordering. Alternatively, the list of discovery commands may be unordered and thus transmitted in any order.

In some embodiments, an indication of success in the discovery results includes output from execution of a particular discovery command on a computing device associated with a particular network address.

In some embodiments, an indication of failure in the discovery results specifies whether a particular discovery command failed due to: a particular network address to which the particular discovery command was transmitted being unreachable, the particular discovery command not being supported by a computing device associated with the particular network address, authentication failure of credentials used by the particular discovery command to access the computing device, or authorization failure of the credentials when the computing device attempted to execute the particular discovery command.

VIII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A method comprising:

obtaining, from a non-transitory memory, a discovery command;

transmitting, via a proxy server, the discovery command to each of a plurality of devices;

receiving, via the proxy server, a plurality of discovery results respectively associated with the plurality of devices, wherein each of the plurality of discovery results indicates an outcome of a corresponding device attempting to execute the discovery command;

storing a plurality of entries in the non-transitory memory, wherein each of the plurality of entries indicates a respective discovery result of the plurality of discovery results; and based on the discovery results, adding a discovery pattern including the discovery command to a scheduled discovery procedure.

2. The method of claim 1, wherein the discovery command is obtained from a first database table within the non-transitory memory, and wherein the plurality of entries is stored in a second database table within the non-transitory memory.

3. The method of claim 2, wherein the first database table specifies a network address of the proxy server through which the discovery command is to be transmitted.

4. The method of claim 2, wherein the first database table specifies authentication credentials to use with the discovery command to access each of the plurality of devices.

5. The method of claim 2, wherein an entry of the plurality of entries includes specifications of: the discovery command, a network address of the corresponding device that attempted to execute the discovery command, and success or failure of executing the discovery command on the corresponding device.

6. The method of claim 1, wherein transmitting the discovery command to each of the plurality of devices is based on a plurality of network addresses, wherein each of the plurality of network addresses identifies a device of the plurality of devices.

7. The method of claim 1, wherein each of the plurality of discovery results includes an indication of success or an indication of failure with regard to execution of the discovery command.

8. The method of claim 7, wherein the indication of success includes output from execution of the discovery command.

9. The method of claim 7, wherein the indication of failure specifies that the discovery command failed due to: a network address to which the discovery command was transmitted being unreachable, the discovery command not being supported by a device associated with the network address, authentication failure of credentials used by the discovery command to access the device, or authorization failure of the credentials when the device attempted to execute the discovery command.

10. The method of claim 1, wherein each of the plurality of devices and the proxy server are disposed within a network, and the discovery command is initially transmitted from outside of the network.

11. The method of claim 1, wherein transmitting the discovery command to each of the plurality of devices occurs in accordance with a network protocol specified for the discovery command.

12. The method of claim 1, wherein transmitting the discovery command to each of the plurality of devices occurs independently of any discovery procedures performed on the plurality of devices.

13. The method of claim 1, wherein the discovery command is from a list of discovery commands that has an ordering, and wherein each of the discovery commands is transmitted in accordance with the ordering.

14. A non-transitory computer-readable medium, storing program instructions that, when executed by one or more processors of a computing system, cause the computing system to perform operations comprising:

obtaining, from a non-transitory memory, a discovery command;

transmitting, via a proxy server, the discovery command to each of a plurality of devices;

receiving, via the proxy server, a plurality of discovery results respectively associated with the plurality of devices, wherein each of the plurality of discovery results indicates an outcome of a corresponding device attempting to execute the discovery command;

storing a plurality of entries in the non-transitory memory, wherein each of the plurality of entries indicates a respective discovery result of the plurality of discovery results; and based on the discovery results, adding a discovery pattern including the discovery command to a scheduled discovery procedure.

15. The non-transitory computer-readable medium of claim 14, wherein the discovery command is obtained from a first database table within the non-transitory memory, and wherein the plurality of entries is stored in a second database table within the non-transitory memory.

16. The non-transitory computer-readable medium of claim 15, wherein an entry of the plurality of entries includes specifications of: the discovery command, a network address of the corresponding device that attempted to execute the discovery command, and success or failure of executing the discovery command on the corresponding device.

17. The non-transitory computer-readable medium of claim 14, wherein each of the plurality of discovery results includes an indication of success or an indication of failure with regard to execution of the discovery command.

18. The non-transitory computer-readable medium of claim 17, wherein the indication of failure specifies that the discovery command failed due to: a network address to which the discovery command was transmitted being unreachable, the discovery command not being supported by a device associated with the network address, authentication failure of credentials used by the discovery command to access the device, or authorization failure of the credentials when the device attempted to execute the discovery command.

19. A computing system comprising:

one or more processors;

memory; and program instructions, stored in the memory, that upon execution by the one or more processors cause the computing system to perform operations comprising:

obtaining, from a non-transitory memory, a discovery command;

transmitting, via a proxy server, the discovery command to each of a plurality of devices;

receiving, via the proxy server, a plurality of discovery results respectively associated with the plurality of devices, wherein each of the plurality of discovery results indicates an outcome of a corresponding device attempting to execute the discovery command;

storing a plurality of entries in the non-transitory memory, wherein each of the plurality of entries indicates a respective discovery result of the plurality of discovery results; and based on the discovery results, adding a discovery pattern including the discovery command to a scheduled discovery procedure.

20. The method of claim 1, wherein transmitting the discovery command to each of the plurality of devices comprises transmitting a test of the discovery command, and wherein the plurality of discovery results comprises a plurality of discovery validation results.

* * * * *